(12) United States Patent
Deshevy (10) Patent No.: US 6,763,599 B2
(45) Date of Patent: Jul. 20, 2004

(54) PLUMB BOB APPARATUS (75) Inventor: Daniel S. Deshevy, Sudbury (CA)

(73) Assignee: C.A.D. Enterprise, Sudbury (CA)

( * ) Notice: Subject to any disclaimer, the term of this patent is extended or adjusted under 35 U.S.C. 154(b) by 0 days.

(21) Appl. No.: 10/141,915

(22) Filed: May 10, 2002

(65) Prior Publication Data
US 2003/0208917 A1 Nov. 13, 2003

(51) Int. Cl.[7] ................................................. G01C 9/12
(52) U.S. Cl. ........................................... 33/391; 33/295
(58) Field of Search .......................... 33/391, 392, 395, 33/397, 398, 399, 400, 401, 402, 293, 295

(56) References Cited

U.S. PATENT DOCUMENTS

| | | | | |
|---|---|---|---|---|
| 279,861 A | * | 6/1883 | Dow | 33/391 |
| 1,125,861 A | * | 1/1915 | McLane | 33/391 |
| 1,328,370 A | * | 1/1920 | Dutton | 33/402 |
| 1,623,234 A | * | 4/1927 | Cutter | 33/399 |
| 1,861,692 A | * | 6/1932 | Gerdes | 33/397 |
| 2,517,295 A | * | 8/1950 | Esher | 33/397 |
| 2,572,766 A | * | 10/1951 | Rylsky | 33/397 |
| 2,835,220 A | * | 5/1958 | Rardin | 33/370 |
| 3,771,876 A | * | 11/1973 | Ljungdahl et al. | 33/291 |

* cited by examiner

Primary Examiner—G. Bradley Bennett
(74) Attorney, Agent, or Firm—Fasken Martineau DuMoulin LLP; Neil Henderson (57) ABSTRACT A plumb bob apparatus comprises a rigid surface mount member for coupling at a proximal end to a surface. The surface mount member is rotatable about its axis. The plumb bob apparatus further includes a rigid device support member for pivotally coupling at a proximal end to a distal end of the surface mount member. When the plumb bob apparatus is coupled to the surface, the device support member will align vertically. The plumb bob can be mounted on a substantially vertical surface.

15 Claims, 9 Drawing Sheets

PLUMB BOB APPARATUS

The present invention relates generally to a plumb bob for mining applications and specifically to a plumb bob apparatus that can be used with laser surveying for accurately establishing directional headings in mining tunnels.

BACKGROUND OF THE INVENTION

In conventional mining operations, it is desirable to ensure that mining tunnel headings are accurately maintained. If the headings of the mining tunnels are inaccurate, extra money is spent to compensate for the error and to regain the correct heading. Furthermore, if a number of tunnels are driven parallel to each other, the intervening unmined material forms support pillars. It may be necessary to provide these parallel tunnels at close distances, and thus a miscalculation in the accuracy of the headings may undermine the strength of the support pillars.

In usual mining operations, the headings of the tunnels are maintained by conventional surveying techniques which include placing a number of spads or hooks in the mine ceiling from which standard plumb bobs are suspended. The standard plumb bobs are used because they hang vertically, regardless of the direction of the surface to which they are attached. This process requires a team of people, which typically includes an engineer. The team uses a pair of standard plumb bobs suspended from spads such that they are perpendicular to the direction of the tunnel. The team uses a surveying device placed on a known location for determining positions of the standard plumb bobs. Once the positions of the standard plumb bobs are determined, the direction of the tunnel is calculated.

It is well known that this operation is inaccurate, time consuming, and expensive. In order to install the standard plumb bobs, holes are drilled into the ceiling of the mine, which can be 15 feet high. In order to drill the holes, the miners halt working and a machine, referred to as a Jumbo costing approximately $750,000, is used. A mine tractor is then used to hoist a miner to the ceiling to install plugs for the spads.

Recent advances have been made that reduce the costs involved in surveying a mine, as well as improving the accuracy of the surveys. Surveying equipment developed by Leica Geosystems AG, Switzerland ("Leica") provides for the rapid detection of the position of a target marking. The target marking is picked-up by imaging optics and a local opto-electronic detector of a theodolite or tachymeter. Electric signals from the detector are rapidly evaluated in a pre-processing unit by formation of sum functions for determining co-ordinates of the target marking.

In current mining applications, the target marking used is a prism. Equipment is brought into the mine to bore a hole in the wall in which to house the prism. The holes are numbered so that they may be used later as necessary. The Leica surveying equipment is used to automatically detect the location of the prisms, thus providing a simpler method for collecting data. As a result, it is often no longer required to have a separate team for calculating the co-ordinates, as the system can be used by the miners themselves.

The requirement to bore holes in the tunnel walls, however, introduces a new expense and step to the process. Equipment that was not previously required now has to be brought into the mine and used to bore the holes. Furthermore, it may be time consuming to bore the hole and place the prisms in the proper location.

Therefore, there is a need for an apparatus that makes it cheaper and simpler to place the prism in the desired location. It is an object of the present invention to obviate or mitigate the above mentioned disadvantages.

SUMMARY OF THE INVENTION

In accordance with an aspect of the invention there is provided a plumb bob apparatus. The plumb bob apparatus comprises a rigid surface mount member for coupling at a proximal end to a surface. The surface mount member is rotatable about its major axis. The plumb bob apparatus further includes a rigid device support member for pivotally coupling at a proximal end to a distal end of the surface mount member. When the plumb bob apparatus is coupled to a surface, the device support member will align vertically. The rigid device support member is also rotatable about its major axis. It is an advantage of the present invention that a plumb bob apparatus can be mounted on a substantially vertical surface.

BRIEF DESCRIPTION OF THE DRAWINGS

An embodiment of the present invention will now be described by way of example only with reference to the following drawings in which.

DETAILED DESCRIPTION OF THE PREFERRED EMBODIMENT

Figure 1:
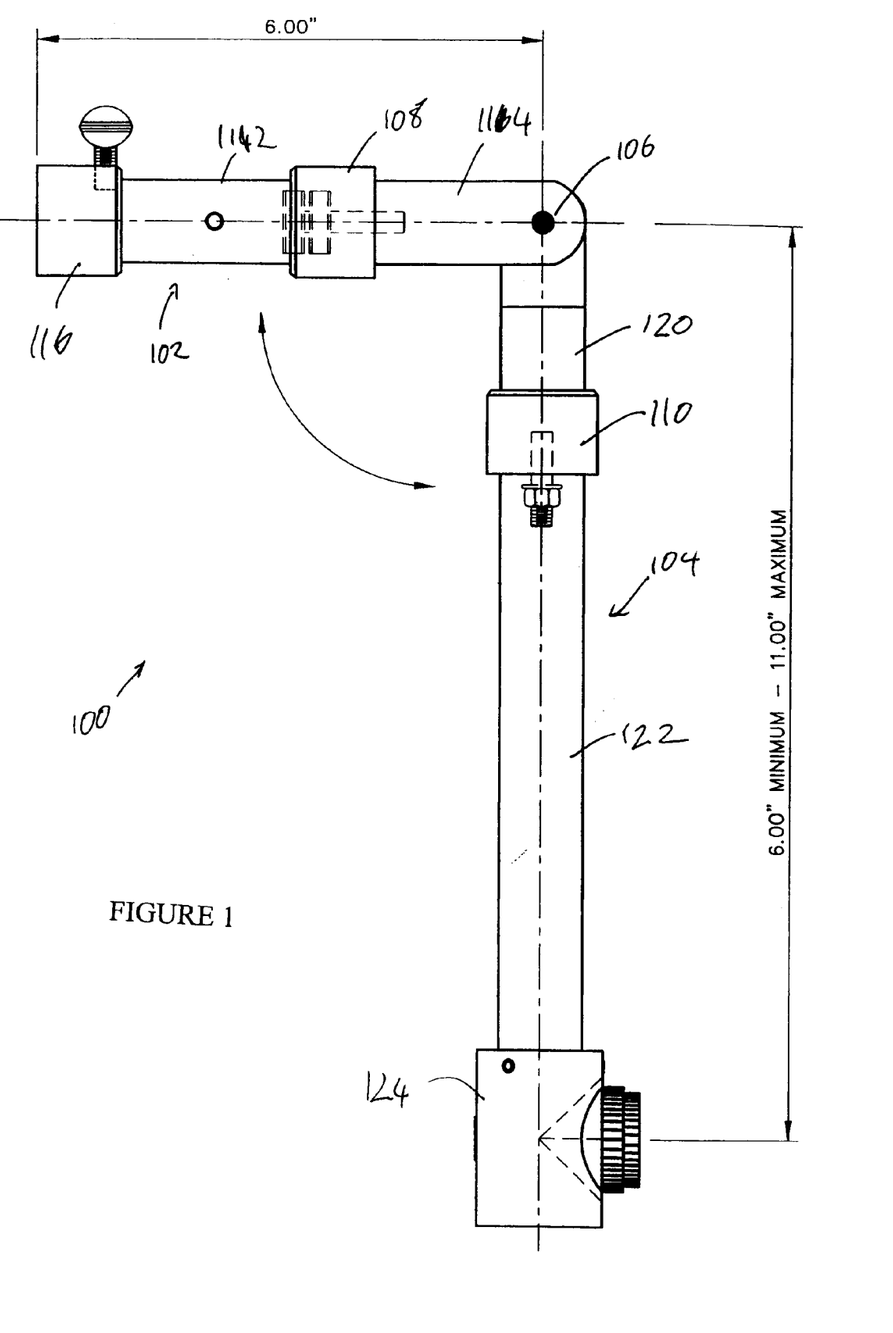
FIG. 1 is a side view of a plumb bob apparatus.
Figure 2:
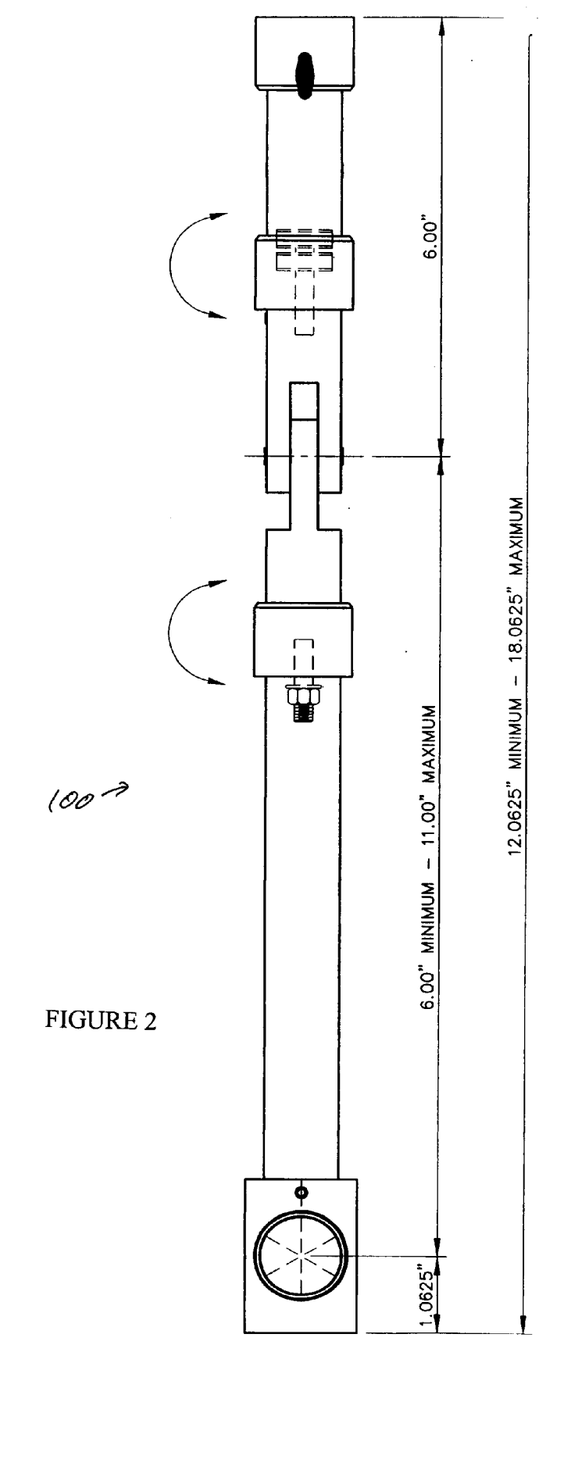
FIG. 2 is a front view of the plumb bob apparatus illustrated in FIG. 1.

For convenience, like numerals in the description refer to like structures in the drawings. Referring to FIGS. 1 and 2, a plumb bob apparatus is illustrated generally by numeral 100. The plumb bob apparatus 100 comprises a rigid tubular wall mount member 102 (generally providing a rigid surface mount member) and a rigid tubular prism support member 104 (generally providing a device support member), each having distal and proximal ends. The proximal end of the wall mount member 102 is used for attaching to a surface, while the distal end is pivotally coupled by a pivot point 106 to the proximal end of the prism support member 104. The pivot point 106 allows the support members 102 and 104 to pivot about their major axes (by way of pivot couplings further described below) (generally providing a joint assembly having the functionality of a universal joint, i.e. three degrees of freedom). The distal end of the prism support member houses a prism.

In an exemplary embodiment, the wall mount member 102 includes a first 112 and a second 114 tubular section, a wall coupling 116, and a pivot coupling 108. The wall coupling 116 is attached to the first tubular section 112 for attaching the plumb bob apparatus 100 to a surface. In the present embodiment, the surface is a wall or, more specifically, a wall mounted plate as will be described in detail. The first tubular section 112 is further attached to the pivot coupling 108. The pivot coupling 108 is coupled to the second tubular section 114 via a bearing (not shown) such that the first tubular section 112 and second tubular section 114 rotate independently about their common major axes. The bearing for the pivot coupling 108 is preferably of sufficient quality to provide a low coefficient of friction. This enables the first tubular section 112 and second tubular section 114 to rotate about their axes with relative ease. That is, the force of gravity operating on the plumb bob apparatus 100 should easily overcome the friction of the bearing. The second tubular section 114 further comprises the pivot point 106 for coupling the wall mount member 102 with the prism support member 104.

Similarly, the prism support member 104 includes a first tubular section 120 and a second tubular section 122, a prism housing 124, and a pivot coupling 110. The prism housing is attached to the second tubular section 122 for attaching a prism to the plumb bob apparatus. The second tubular section 122 is further coupled to the pivot coupling 110 via a bearing (not shown) such that the first tubular section 120 and the second tubular section 122 rotate independently about their common major axes. The bearing for the pivot coupling 110 is preferably of sufficient quality to provide a medium coefficient of friction. That is, the pivot coupling 110 should provide some resistance to motion of the first tubular section 120 and the second tubular section 122 about their axes but the friction should be able to be overcome when a force is applied. The first tubular section 120 is attached to the pivot coupling 110. This enables the first tubular section 120 and the second tubular section 122 to rotate about their axes with relative ease, but a greater force is required than that for the pivot coupling 108 for the wall mount member 102. The first tubular section 120 further comprises the pivot point 106 for coupling the prism support member 104 with the wall mount member 102.

Referring to FIG. 3, the components described above are illustrated in greater detail. Referring to FIG. 3a, the wall coupling 116 is illustrated. In the present embodiment, the wall coupling comprises a sleeve for covering the first tubular section 112. The sleeve comprises a threaded hole. The threaded hole is aligned with a hole in the first tubular section and a screw is inserted through both holes for attaching the wall coupling 116 with the first tubular section 112. A plate having a protrusion is attached to a wall in the mine. The protrusion is inserted into the aperture of the wall coupling 116 and the screw is tightened for securing the plumb bob apparatus to the wall.

Figure 3A:
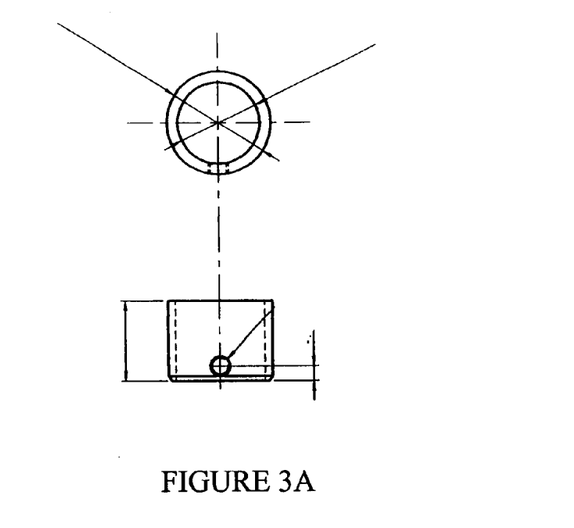
FIGS. 3a–3h are components of the plumb bob apparatus illustrated in FIG. 3.
Figure 3B:
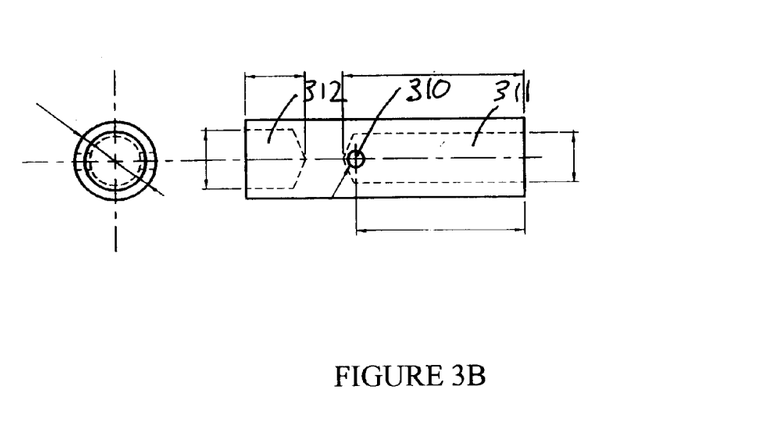

Referring to FIG. 3b, the first tubular section 112 is illustrated. The first tubular section 112 includes a spring pin 310 across the diameter of the tube. The spring pin 310 is located approximately two thirds along the length of the tube 112, effectively separating the tube 112 into two cavities. The longer of the cavities 311 receives the protrusion. The shorter of the cavities 312 receives a bearing assembly attached to the pivot coupling 108. The spring pin 310 is located to allow the wall protrusion to stop at a desired distance of the protrusion.

Figure 3C:
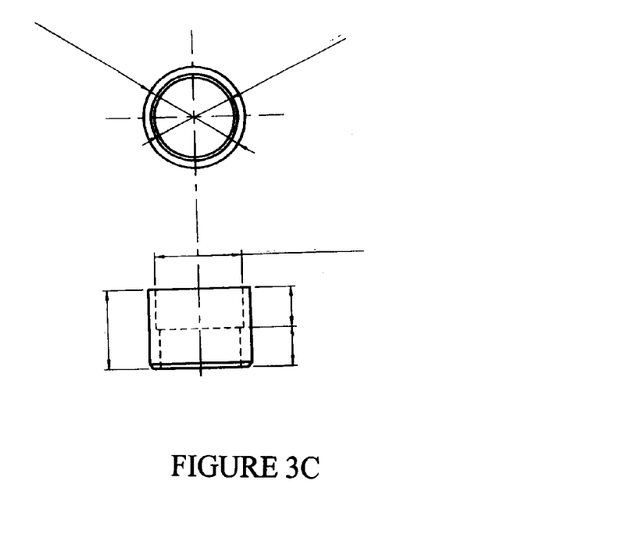

Referring to FIG. 3c, the pivot coupling 108 is illustrated. The pivot coupling 108 couples the first tubular section 112 with the second tubular section 114. The pivot coupling 108 comprises a sleeve, which rotatably attaches to a bearing (not shown) for allowing the first and second tubular sections 112 and 114 to pivot about their common major axes. The sleeve of the pivot assembly is fixedly attached to the first tubular section 112. This may be achieved by using a strong adhesive or even welding the components together as will be appreciated by a person skilled in the art. The bearing is fixedly attached to the second tubular section 114. This is achieved using a screw. The bearing comprises a protrusion for attaching it to the second tubular section 114.

Figure 3D:
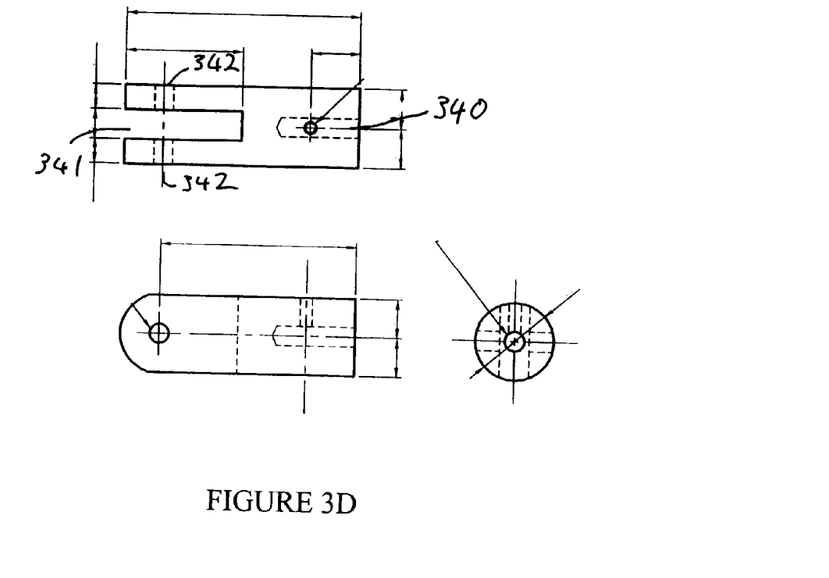

Referring to FIG. 3d, the second tubular section 114 is illustrated. The second tubular section 114 includes at one end a cavity 340 for receiving the protrusion of the pivot coupling 108. The protrusion is then held in place by a set screw. The second tubular section 114 further includes, at the other end, a u-shaped recess 341. Towards the open end of the u-shaped recess, holes 342 are drilled into the second tubular section 114 for providing the pivot point 106.

Figure 3E:
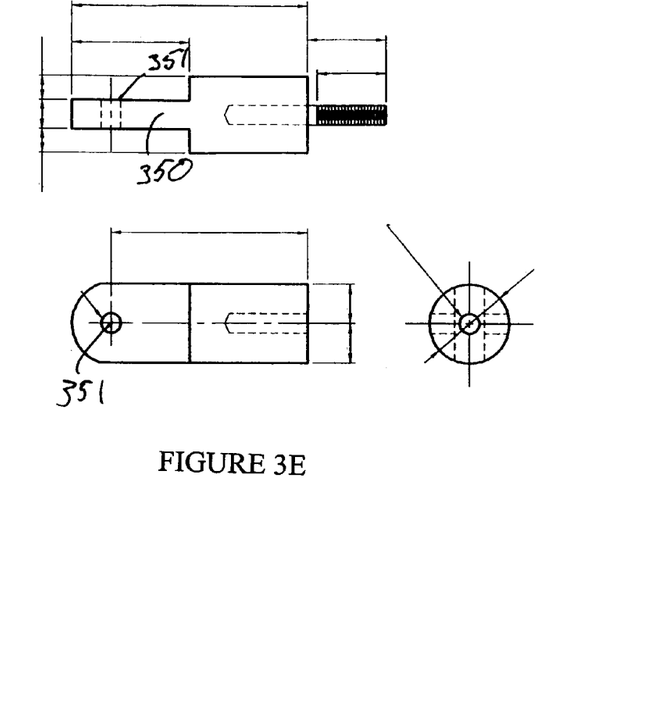

Referring to FIG. 3e, the first tubular section 120 of the prism support member 104 is illustrated. At one end, the first tubular section 120 includes a protrusion 350. Towards the end of the protrusion 350 a hole 351 is drilled for providing the pivot point 106. When coupling the wall mount member 102 and the prism support member 104 the hole 351 is aligned with the holes 342 in the wall mount member 102. A pin is inserted through the holes 342 and 351 for providing an axis of rotation. At the other end of the first tubular section 120, a threaded protrusion is provided.

Collectively, the second tubular section 114 with the u-shaped recess 341 and holes 342 pivotally coupled by a pin through the hole 351 in the protrusion 350 of the first tubular section 120 together with the pivot coupling 108 for the wall mount member 102 and the pivot coupling 110 for the device support member generally provide a joint assembly having the functionality of a universal joint, i.e. three degrees of freedom.

Figure 3F:
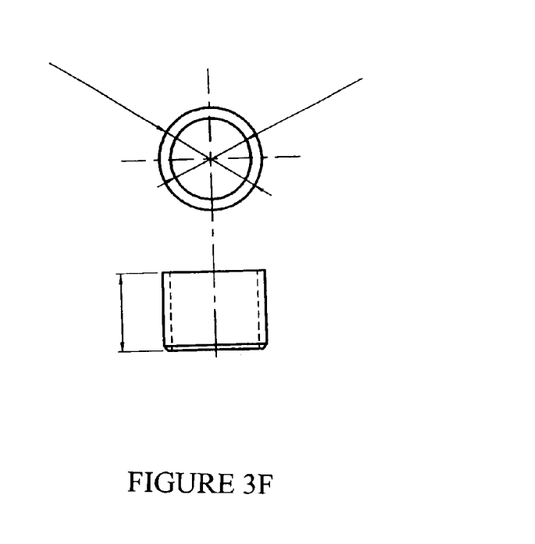

Referring to FIG. 3f, the pivot coupling 110 for coupling the first tubular section 120 and second tubular section 122 is illustrated. The pivot coupling comprises a sleeve, which rotatably attaches to a bearing (not shown) for allowing the first and second tubular sections 120, 122 to pivot about their axes. It should be noted that the first and second tubular sections 120, 122 generally share a common axis. The sleeve of the pivot assembly is fixedly attached to the first tubular section 120. As with the previous pivot coupling 108, this may be achieved by using a strong adhesive or even welding the components together as will be appreciated by a person skilled in the art. The bearing is fixedly attached to the second tubular section 122, also using a screw. The bearing comprises a cavity for receiving a screw from the second tubular section 122.

Figure 3G:
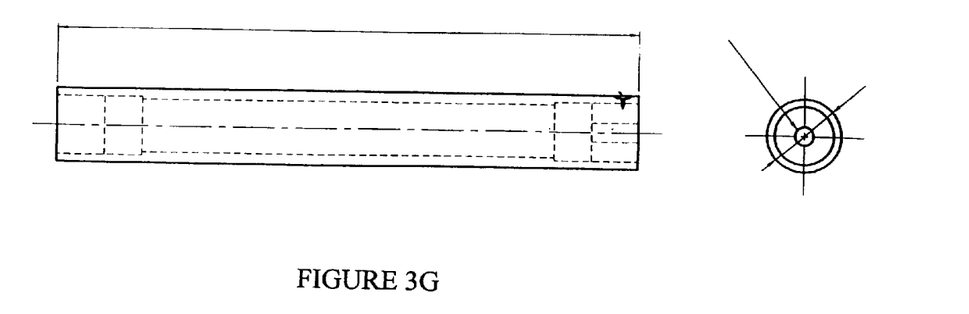

Referring to FIG. 3g, the second tubular section 122 of the prism support member 104 is illustrated. At one end the tube 122 has an opening through which to insert a screw. The screw couples the tube 122 with the pivot coupling 110. At the other end, the tube 122 is formed to receive the prism housing.

Figure 3H:
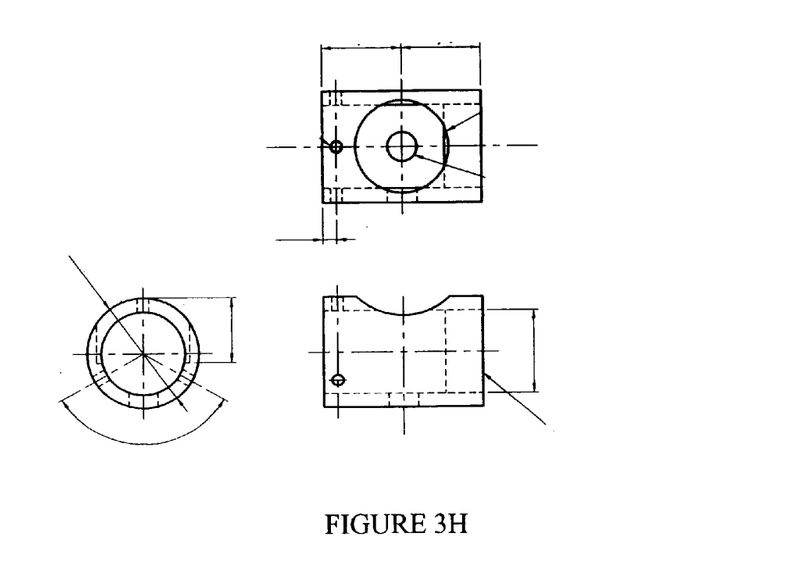
Figure 3I:
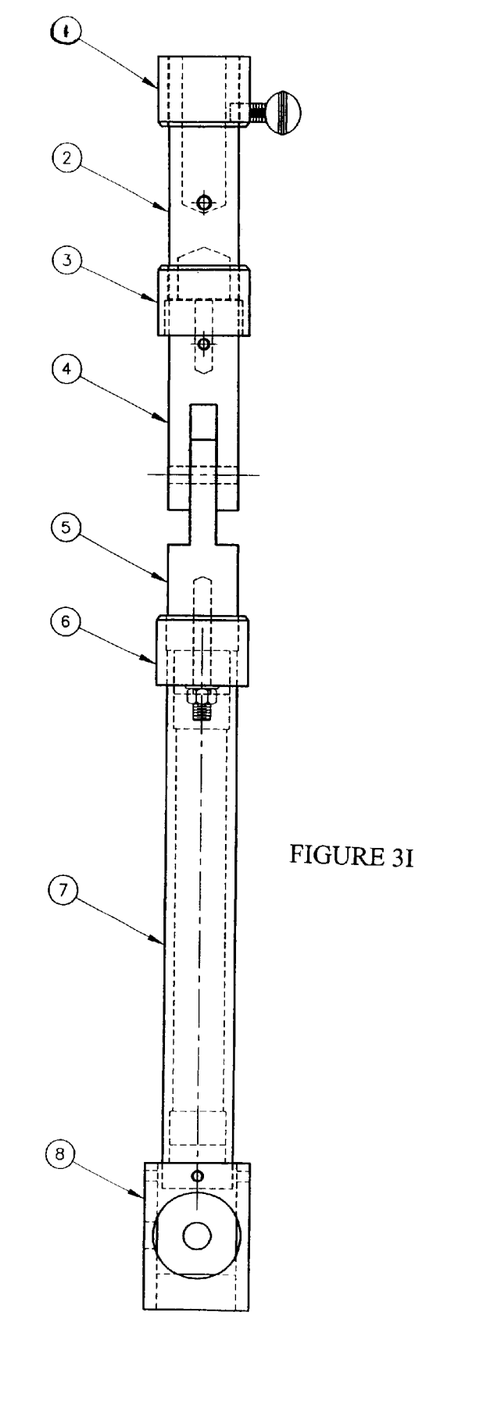
FIG. 3i is a front view of the plumb bob apparatus similar to that shown in FIG. 2.

Referring to FIG. 3h, the prism housing 124 is illustrated. The prism housing 124 is a cup-shape, being cylindrical in shape and having a close bottom end and an open top end. The diameter of the prism housing is larger than that of the second tubular section 122 and is designed such that they fit snugly together. The prism housing is fixed to the tube 122 using set screws or the like. Furthermore, the prism housing includes a prism for reflecting the light being sent in its direction. A person skilled in the art will appreciate that the prism may be substituted for other devices as may be required by the specific implementation.

Thus, in operation, the wall coupling 116 is attached to a rock bolt or other protruding device, which is attached to a surface in the mine. Typically, in mining operations sheets of screen are bolted to the mine ceiling and walls to secure safety for the miners. As a result, there are often protruding bolts to which the wall coupling can be attached. Alternately, if no bolts are available, one can easily be inserted into the wall. The ability of the wall mount member 102 to rotate about its axis combined with the ability of the wall mount member 102 and prism support member 104 to rotate about the pivot point 106 provides two-axes of rotation, which allows the apparatus to function as a plumb bob. That is, regardless of the direction of the surface to which the plumb bob apparatus is attached, the prism support member 104 will hang vertically. The prism support member 104 can rotate about its own axis merely to ensure that the prism can be aligned to face the general direction of the light projected at it.

The exemplary plumb bob apparatus 110 as described above provides several advantages. Little extraneous equipment is required in the mine to use or operate the embodiment of the invention. The apparatus is attached to the rock bolt or other protruding device by tightening a screw and removed by loosening the screw. The rock bolt or protruding device can be marked in the event that the plumb bob apparatus 110 needs to be set up again. This may happen, for example, if a further tunnel is to branch from the original tunnel.

Figure 4:
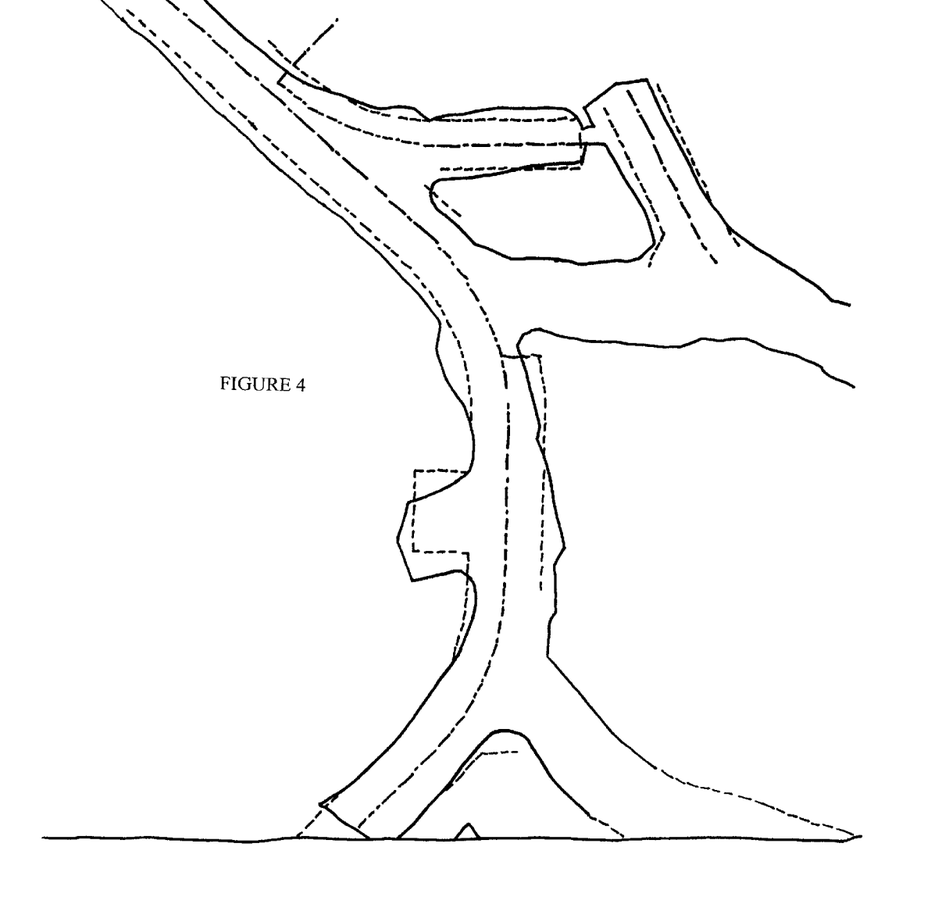
FIG. 4 is a tunnel map illustrating the deviation of the actual tunnel from the designed tunnel using prior art equipment.
Figure 5:
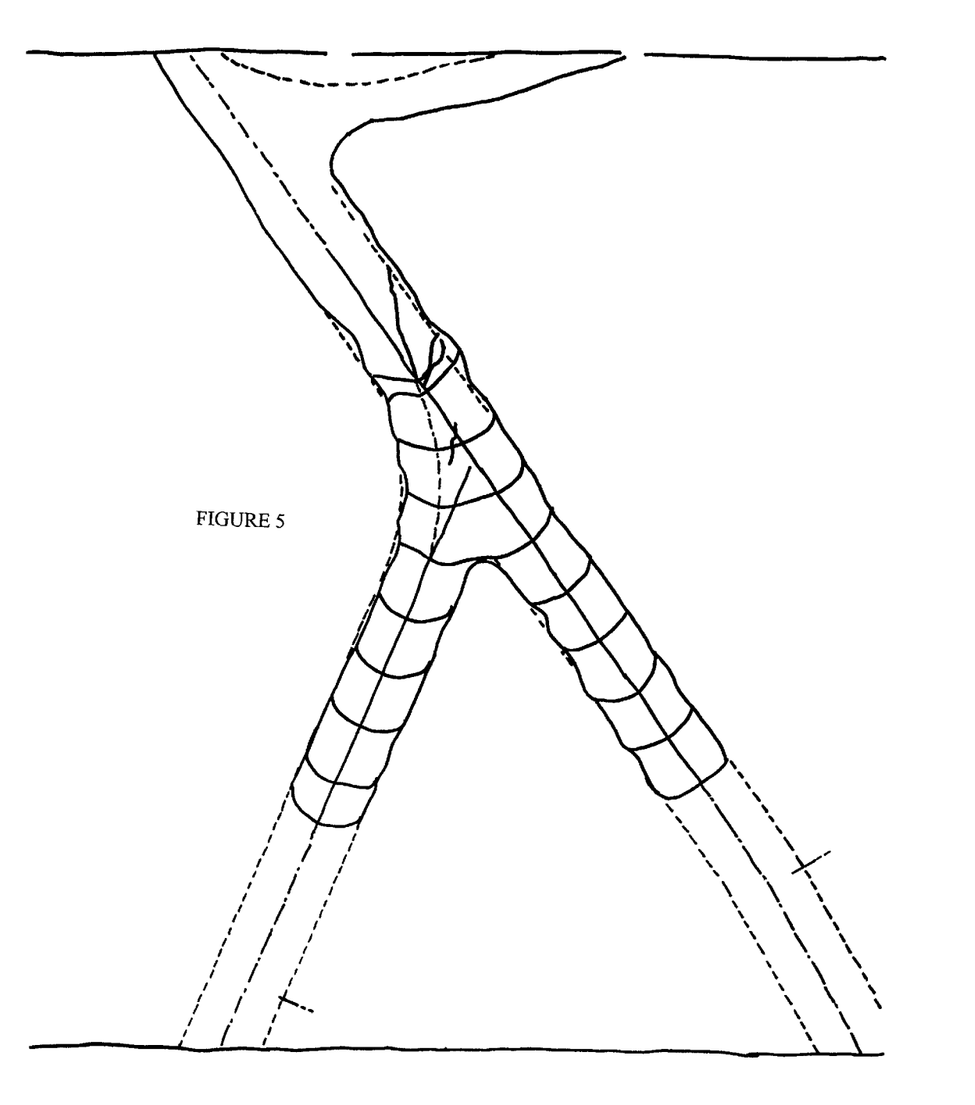
FIG. 5 is a tunnel map illustrating the deviation of the actual tunnel from the designed tunnel using new equipment and the plumb bob of the present invention.

Referring to FIG. 4, a tunnel map illustrates the accuracy of prior art systems. The dashed lines indicate the designed tunnel route and the solid lines indicate the actual tunnel. As illustrated the actual tunnel deviates significantly from the designed direction. Referring to FIG. 5, a tunnel map illustrates the accuracy of current systems using the plumb bob of the present invention. As illustrated, the accuracy of the actual tunnel with respect to the designed tunnel has improved dramatically.

While the above description was provided with reference to specific embodiments, various modifications will become apparent to a person skilled in the art. For example, the members 102 and 104 where described as tubular, but they can be other shapes. While the different couplings are described as having different coefficients of friction, it is not necessarily so. The higher coefficient of friction for the prism support member coupling is primarily to inhibit unwanted rotation of the prism housing. The wall attachment may be more sophisticated than a sleeve that receives a protrusion from a plate. Furthermore, the plumb bob apparatus is not restricted to housing a prism, but may be used for other devices as desired.

In addition, the length of the rigid tubular wall mount member 102 being made up of a first tubular section 112 and a second tubular section 114, may be of varying length as required in the field. Further, the length of the rigid tubular prism support member 102 being made up of a first tubular section 120 and a second tubular section 122 may be of varying length as required in the field, so long as the length of the rigid tubular prism support member 102 or a counter weight allows the rotation of the second tubular section 122 and thus the sighting device in 3 axes in order to allow the second tubular section 122 and the sighting device to align substantially vertically.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A plumb bob apparatus comprising:
   a) a rigid surface mount member for coupling at a proximal end to a surface, said surface mount member being rotatable about an axis between said proximal end and a distal end of said rigid surface mount member; and
   b) a rigid device support member for pivotally coupling at a proximal end to said distal end of said surface mount member;
   wherein when said plumb bob apparatus is coupled to said surface, said device support member will align vertically.

2. A plumb bob apparatus as defined in claim 1, wherein said surface mount member further comprises:
   a) a surface coupling for coupling said surface mount member with said surface,
   b) a first section for coupling to said surface coupling;
   c) a second section for pivotally coupling to said device support member; and
   d) a pivot coupling for rotatably coupling said first and second sections such that they rotate about their axis.

3. A plumb bob apparatus as defined in claim 1, said device support member being rotatable about its axis.

4. A plumb bob apparatus as defined in claim 3, wherein said device support member further comprises:
   a) a housing for housing a prism;
   b) a first section for pivotally coupling to said surface mount member;
   c) a second section for coupling to said housing; and
   d) a pivot coupling for rotatably coupling said first and second sections such that they rotate about their axis.

5. A plumb bob apparatus as defined in claim 4, wherein said pivot coupling for said device support member has a higher coefficient of friction than said pivot coupling for said surface mount member.

6. A plumb bob apparatus for sighting comprising:
   a surface mount member;
   a device support member;
   a joint assembly coupling said surface mount member to said device support member; and
   a housing on said device support member for housing a sighting device,
   wherein said joint assembly is adapted to allow said device support member to rotate about 3 axes such that, when said surface mount member is coupled to a surface, said device support member will align substantially vertically allowing said sighting device to sight.

7. A plumb bob apparatus according to claim 6, wherein said surface mount member further comprises a surface coupling for coupling said surface mount member to a surface.

8. A plumb bob apparatus according to claim 6, wherein said sighting device comprises a prism.

9. A plumb bob apparatus according to claim 6, wherein said joint assembly comprises a universal joint.

10. A plumb bob apparatus according to claim 6, wherein said joint assembly comprises:
    a first connector connected to said surface mount member for allowing said surface mount member and said joint assembly to rotate in relation to each other about said first connector;
    a second connector connected to said device support member for allowing said device support member and said joint assembly to rotate in relation to each other about said second connector; and
    a pivot connector connecting said first connector and said second connector for allowing said first connector and said second connector to pivot about said pivot connector.

11. A plumb bob apparatus comprising:

an elongated surface mount member comprising a proximal portion and a distal portion, wherein said proximal portion and said distal portion are rotatably coupled by a first coupling such that said proximal portion and said distal portion rotate relative to each other about a major axis of said elongated surface mount member;

a device support member;

a pivot for pivotally coupling said distal portion of said surface mount member to said device support member; and a sighting device provided to said device support member, wherein, when said proximal portion of said surface mount member is coupled to a fixed surface, said device support member will align substantially vertically and said sighting device can be used to sight.

12. A plumb bob apparatus according to claim 11, wherein said device support member is elongated and comprises a proximal portion and a distal portion, wherein said proximal portion and said distal portion of said device support member are rotatably coupled by a second coupling such that said proximal portion and said distal portion of said device support member rotate relative to each other about a major axis of said elongated device support member.

13. A plumb bob apparatus according to claim 11, wherein said proximal portion of said surface mount member further comprises a surface coupling for coupling said surface mount member to a surface.

14. A plumb bob apparatus according to claim 11, wherein said sighting device comprises a prism.

15. A plumb bob apparatus according to claim 12, wherein said first coupling has a lower coefficient of friction than said second coupling.

* * * * *